Aug. 26, 1941.   W. R. APPLEMAN ET AL   2,253,599
ELECTRIC MOTOR
Filed Oct. 31, 1938
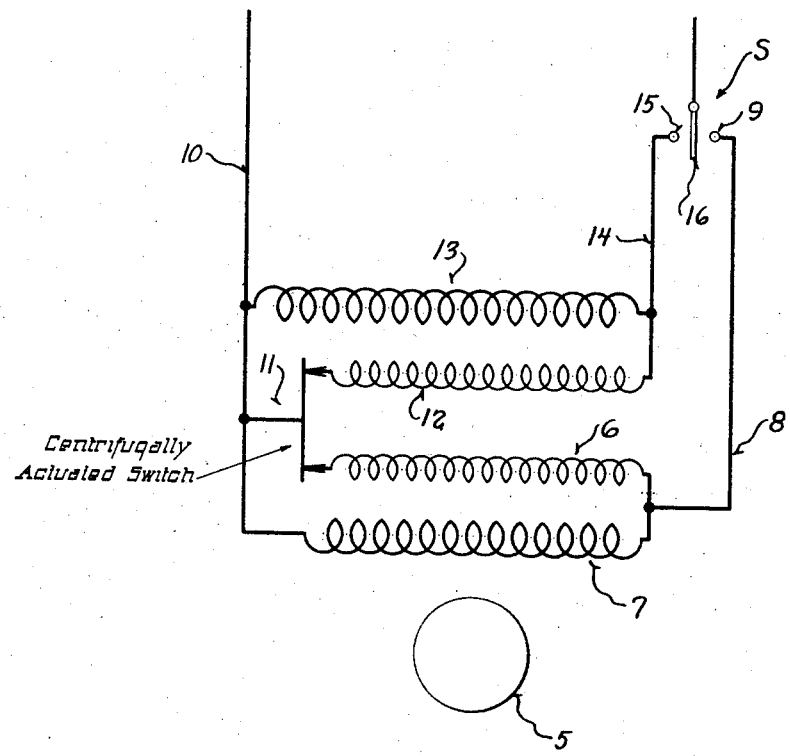
Inventors
Wilbur R. Appleman
John T. Howes
John V. Dalnodar
By
Attorney Patented Aug. 26, 1941

2,253,599

UNITED STATES PATENT OFFICE 2,253,599

ELECTRIC MOTOR

Wilbur R. Appleman, John T. Howes, and John V. Dalnodar, Wausau, Wis., assignors to Marathon Electric Manufacturing Corporation, Wausau, Wis., a corporation of Wisconsin Application October 31, 1938, Serial No. 237,868

3 Claims. (Cl. 172—279)

This invention relates to electric motors, and refers more particularly to single phase induction motors.

It is an object of this invention to provide a motor of the character described with a plurality of windings to enable multiple speed operation and to so connect these windings that only three leads running thereto are necessary for connecting the motor with a source of current.

Another object of this invention is to provide a simple manner of quickly shifting the connections necessary for changing the speed of the motor.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

The single figure is a diagrammatic illustration of one practical embodiment of this invention.

Referring now particularly to the accompanying drawing in which like numerals indicate like parts, the numeral 5 designates the rotor or armature of the motor, and the numerals 6 and 7 designate, respectively, low speed starting and running windings arranged in the customary manner with relation to the rotor. These windings are connected at one end and have a lead 8 running therefrom to one contact 9 of a switch S by which the speed selection is effected.

The opposite end of the low speed running winding 7 is connected with a lead 10 which connects with one side of the source of current supply, and the adjacent end of the low speed starting winding 6 is connected with this lead 10 through a centrifugally actuated switch 11.

The switch 11 has two sets of complementary contacts to connect not only the low speed starting winding 6 with the lead 10 but also one end of a high speed starting winding 12. The high speed starting winding has its opposite end connected with the adjacent end of a high speed running winding 13, and like in the set of low speed windings, a line 14 leads from the connected ends of the high speed windings to a contact 15 of the switch S. The opposite end of the high speed running winding is connected to the line 10.

The contactor 16 of the switch S is connected with the other side of the source of current supply so that upon engagement thereof with the contact 9, the set of low speed windings is connected in circuit and upon shifting of the contactor to engage the contact 15, the high speed set of windings is connected in circuit.

As is customary, when the motor is first connected across the lines, the selected starting winding is in circuit, but as soon as the motor comes up to the speed at which the centrifugally actuated switch 11 responds, the starting winding is cut out of circuit by the opening of the switch.

From the foregoing description taken in connection with the accompanying drawing, it will be readily apparent to those skilled in the art, that this invention provides an exceptionally simple manner of effecting multiple speed operation in an induction motor especially in view of the fact that only three leads actually come from the motor.

What we claim as our invention is:

1. In an electric motor having a single armature: two sets of starting and running windings associated with said armature, the starting and running windings of each set being electrically connected at one end; a lead connected with the connected ends of the windings of one set; a second lead connected with the connected ends of the windings of the other set; a third lead permanently connected with the opposite ends of the running windings of both sets; and a centrifugally actuated switch having a contactor permanently connected with said third lead and contacts engageable thereby and connected with the open ends of the starting windings for connecting the third lead with the open ends of the starting winding of both sets.

2. In an electric motor having a single armature: two sets of starting and running windings associated with said armature, the starting and running windings of each set being electrically connected at one end; a lead connected with the connected ends of the windings of one set; a second lead connected with the connected ends of the windings of the other set; a third lead permanently connected with the opposite ends of the running windings of both sets; a centrifugally actuated switch for connecting the third lead with the open ends of the starting winding of both sets; and a single pole double throw switch for selectively connecting either of the first two leads with a power line.

3. In an induction motor having a single armature: a set of low speed starting and running windings; a set of high speed starting and running windings; a first lead electrically connected with one end of the low speed starting and running windings; a second lead connected with one end of the high speed starting and running windings; a single pole double throw switch for connecting either of said leads with one side of a power line; a third lead connected with the opposite end of each of the running windings for connecting the same with the other side of the power line; and a centrifugally responsive switch for normally connecting the open opposite ends of the two starting windings with said third lead, said centrifugally responsive switch opening to simultaneously disconnect the said opposite ends of both of the starting windings from said last named side of the power line upon the attainment of a predetermined motor speed.

WILBUR R. APPLEMAN.
JOHN T. HOWES.
JOHN V. DALNODAR.